US012736835B2

(12) United States Patent
Clarke et al.

(10) Patent No.: US 12,736,835 B2

(45) Date of Patent: Sep. 15, 2026

(54) ELECTRICALLY SWITCHABLE LIQUID CRYSTAL CELL, CONTACT LENS AND METHOD RELATING THERETO

(71) Applicant: CooperVision International Limited, Fareham (GB)

(72) Inventors: Roger Brian Minchin Clarke, Cambridge (GB); Robert Oag, Southampton (GB); Robert Chisholm, Amesbury (GB); Mark Chalmers, Bournemouth (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 19/118,451

(22) PCT Filed: Oct. 23, 2023

(86) PCT No.: PCT/GB2023/052762

§ 371 (c)(1),
(2) Date: Apr. 4, 2025

(87) PCT Pub. No.: WO2024/089400

PCT Pub. Date: May 2, 2024

(65) Prior Publication Data

US 2026/0044023 A1 Feb. 12, 2026

Related U.S. Application Data

(60) Provisional application No. 63/420,101, filed on Oct. 28, 2022.

(51) Int. Cl.

*G02C 7/08* (2006.01)
*G02C 7/04* (2006.01)

(52) U.S. Cl.

CPC ............... *G02C 7/083* (2013.01); *G02C 7/04* (2013.01); *G02C 2202/20* (2013.01)

(58) Field of Classification Search

CPC ...... G02C 7/083; G02C 7/04; G02C 2202/20; G02C 7/08

(Continued)

(56) References Cited

U.S. PATENT DOCUMENTS 10,126,569 B2 11/2018 Blum et al.
2008/0273167 A1* 11/2008 Clarke ................ G02B 5/1876 359/558

FOREIGN PATENT DOCUMENTS

WO 2018058141 A1 3/2018
WO 2021089178 A1 5/2021

OTHER PUBLICATIONS

International Search Report and Written Opinion issued in corresponding International Patent Application No. PCT/GB2023/052762 dated Feb. 2, 2024 (14 pages).

* cited by examiner

*Primary Examiner* — Tuyen Tra

(74) *Attorney, Agent, or Firm* — Kilyk & Bowersox, P.L.L.C.

(57) ABSTRACT

An electrically-switchable liquid crystal cell (10) is provided, along with a lens (50) comprising the cell, and methods of manufacturing the cell. The liquid crystal cell (10) includes a diffractive optical element (12) and liquid crystal material (14) switchable between an unmatched state and a matched state. In the unmatched state, the effective refractive index of the liquid crystal material (14) is different from the refractive index of the base material (18) of the diffractive optical element (12). In the matched state, the effective refractive index of the liquid crystal material (14) matches the refractive index of the base material (18). In the (Continued)

matched state the diffractive optical element does not contribute a focal power for the lens. The diffractive optical element (12) has a number of peaks (20) and troughs (30) having rounded corners.

13 Claims, 6 Drawing Sheets

(58) Field of Classification Search
USPC .................... 351/41, 159.01, 159.02, 159.03
See application file for complete search history.

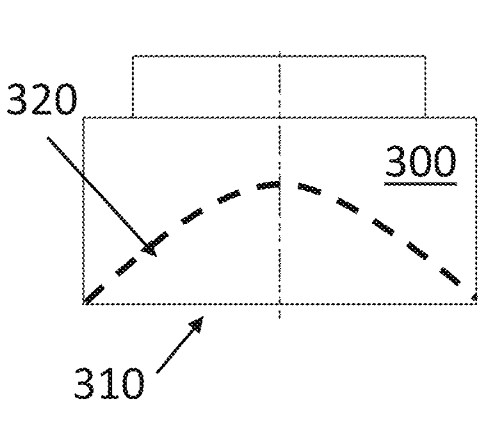
FIG. 9A
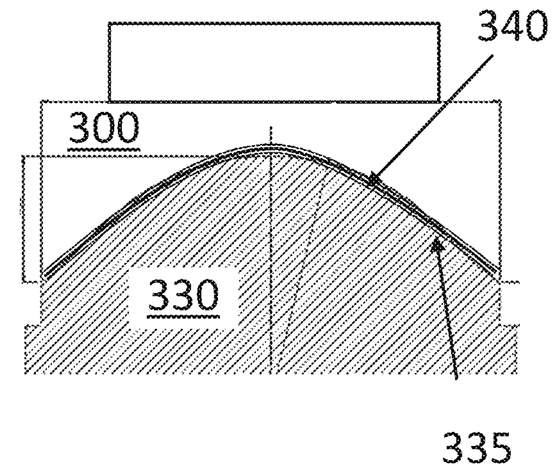
FIG. 9B
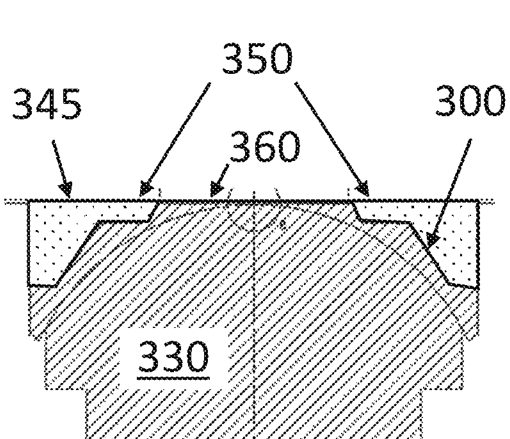
FIG. 9C
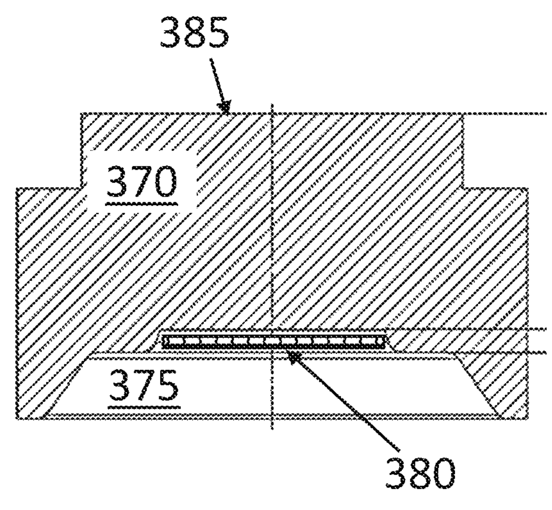
FIG. 9D
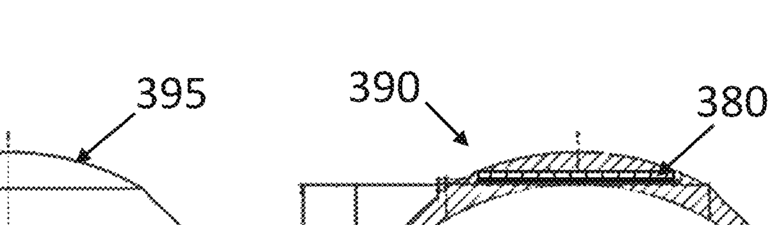
FIG. 9E
FIG. 9F

ELECTRICALLY SWITCHABLE LIQUID CRYSTAL CELL, CONTACT LENS AND METHOD RELATING THERETO

This application is a National Stage Application of PCT/GB2023/052762, filed Oct. 23, 2023, which claims priority to U.S. Patent Application No. 63/420,101, filed Oct. 28, 2022.

FIELD

The present disclosure relates to ophthalmic contact lenses. More particularly, but not exclusively, this disclosure concerns an electrically-switchable ophthalmic contact lens.

BACKGROUND

Presbyopia, the inability of the eye to focus on near objects due to hardening of the crystalline lens in the eye, affects nearly all people as they age. Reading spectacles with a power of between +1.0 and +3.0 Dioptres for near vision have provided a solution to this problem for many years, as have bifocal or multifocal spectacles which have the added advantage of being able to provide additional corrective powers for other conditions such as myopia, such that only one pair of spectacles need be worn for both near and distance vision.

Multifocal contact lenses represent a further improvement for presbyopic patients. For example multifocal contact lenses with concentric ring patterns are known, where a central zone functions for either short- or long-sightedness and the surrounding rings alternate between short- and long-sighted prescriptions. These multifocal contact lenses have suffered from poor image quality and not all users adapt to them.

Ophthalmic contact lenses are increasingly being developed with electronic components. For example, contact lenses with 'tuneable' diffractive optical elements have been formed using cholesteric liquid crystal (a nematic liquid crystal that has been doped with a chiral dopant). Such liquid crystals are well-known to those skilled in the art (of liquid crystal science), and may comprise E7, BL037 and/or BL038, for example. The chiral dopants are also well-known to those skilled in the art of liquid crystal science, and include Merck ZLI-3786, CB15 and S811.

With associated lens circuitry, contact lenses incorporating such tuneable diffractive optical elements are electrically-switchable between diffractive and non-diffractive states, thus providing a multifocal contact lens with two alternately switchable optical powers.

A known problem with this arrangement is that it is difficult to achieve an acceptable optical performance without introducing unwanted light scatter arising from the diffractive optical elements. Furthermore these contact lenses are difficult to manufacture.

The present disclosure seeks to provide an improved liquid crystal cell and contact lens comprising a diffractive optical element.

SUMMARY

According to a first aspect of the present disclosure, there is provided an electrically-switchable liquid crystal cell for changing a focal power of a contact lens, the liquid crystal cell comprising a diffractive optical element switchable between an unmatched state and a matched state, wherein:

in the unmatched state, the effective refractive index of the liquid crystal cell is different from the refractive index of the diffractive optical element; and in the matched state, the effective refractive index of the liquid crystal cell matches the refractive index of the diffractive optical element, such that the diffractive optical element does not contribute a focal power for the lens, wherein the diffractive optical element comprises a plurality of diffraction blazes, each one of the plurality of diffraction blazes defining a peak and a trough, at least one of the plurality of diffraction blazes having a peak and/or a trough with rounded corners.

According to a second aspect of the present disclosure, there is provided an electrically-switchable contact lens comprising the liquid crystal cell described above.

According to a third aspect of the present disclosure, there is provided a method of fabricating an electrically-switchable contact lens assembly for correcting the vision of a user, the method comprising:

- providing first and second contact lens polymer elements each having respective front and a rear surfaces, the front surface of the first contact lens polymer element including a recess;
- inserting into the recess a liquid crystal cell including a diffractive optical element, the liquid crystal cell being switchable between an unmatched state and a matched state; and
- attaching the front surface of the first polymer element to the rear surface of the second polymer element to form the contact lens assembly;
- wherein in the unmatched state, the effective refractive index of the liquid crystal is different from the refractive index of the diffractive optical element, and in the matched state the effective refractive index of the liquid crystal matches the refractive index of the diffractive optical element, such that in the matched state the diffractive optical element does not contribute a focal power for the lens assembly.

It will of, course, be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Example embodiments will now be described, by way of example only, with reference to the accompanying schematic drawings.

FIGS. 9A to 9F show a series of side-view and cross-sectional diagrams which illustrate the method steps of fabricating a contact lens according to a further aspect of the present application.

DETAILED DESCRIPTION

Figure 1:
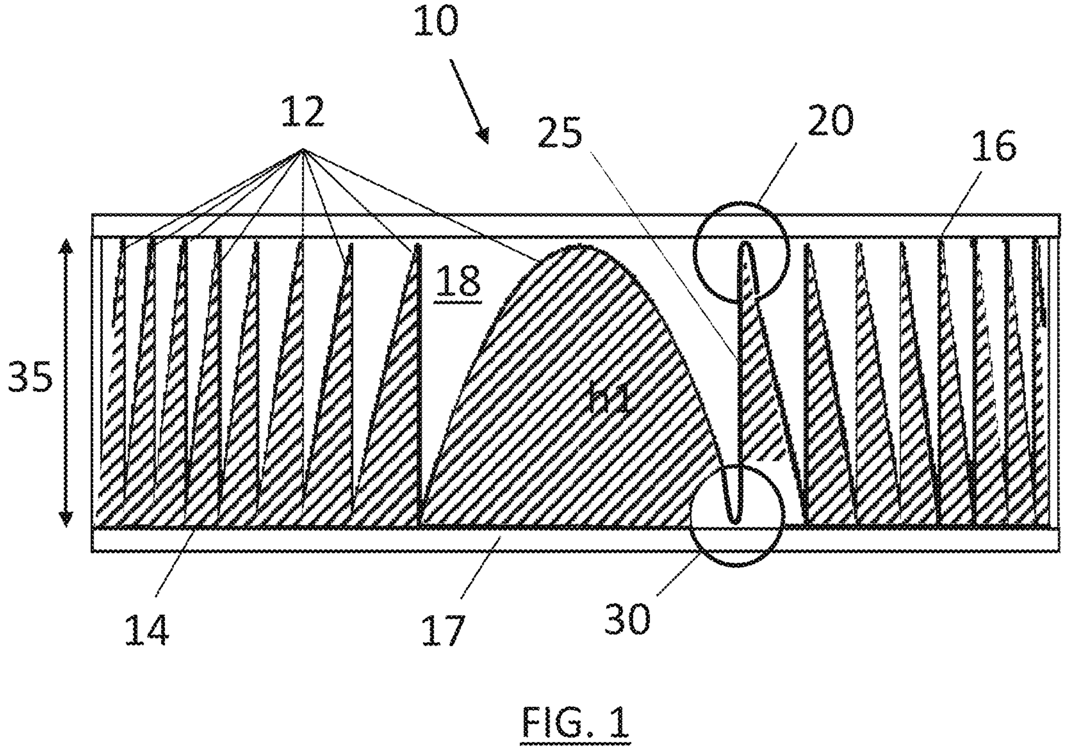
FIG. 1 is a schematic side-on cutaway view of an example of a liquid crystal cell in accordance with a first aspect of the present disclosure.

The present disclosure provides, in accordance with a first aspect, an electrically switchable liquid crystal cell for changing a focal power of a contact lens, the liquid crystal cell comprising a diffractive optical element switchable between an unmatched state and a matched state. In the unmatched state, the effective refractive index of the liquid crystal cell is different from the refractive index of the diffractive optical element. In the matched state, the effective refractive index of the liquid crystal cell matches the refractive index of the diffractive optical element, such that the diffractive optical element does not contribute a focal power for the lens. The diffractive optical element comprises a plurality of diffraction blazes, each one of the plurality of diffraction blazes defining a peak and a trough, at least one of the plurality of diffraction blazes having a peak and/or a trough with rounded corners.

The liquid crystal cell may be unpowered in the unmatched state, and powered in the matched state. Alternatively, the liquid crystal cell may be powered in the unmatched state, and unpowered in the matched state.

For example, when no electric current is applied to the liquid crystal cell, the liquid crystal may be so arranged to present an effective refractive index which does not match the refractive index of the diffractive optical element. Incident light is subject to diffraction by the diffractive optical element, and in this way a contribution to the focal power of the lens is provided. When an electric current is applied to the liquid crystal cell, the liquid crystal presents an effective refractive index which matches the refractive index of the diffractive optical element, so that incident light is not diffracted and no contribution to the focal power of the lens occurs.

Alternatively, when no electric current is applied to the liquid crystal cell, the liquid crystal may be so arranged to present an effective refractive index which matches the refractive index of the diffractive optical element so that incident light is not diffracted and no contribution to the focal power of the lens occurs. When an electric current is applied to the liquid crystal cell, the liquid crystal presents an effective refractive index which does not match the refractive index of the diffractive optical element, so that incident light is subject to diffraction by the diffractive optical element, and a contribution to the focal power of the lens is provided.

The liquid crystal cell may be arranged in use to be selectively powered from a power source and optoelectronic circuitry within the contact lens.

Furthermore the applicant has discovered that in contrast to the standard diffractive design of sharp diffraction blazes (which maximise diffractive efficiency), providing a series of diffraction blazes defining peaks and troughs with rounded corners and, optionally, non-vertical edges, reduces the impact of image interference due to light scatter and improves the alignment characteristics of liquid crystals when switched on (powered), while still providing sufficient diffractive efficiency for the lens.

The radius of curvature of the rounded corners of the peaks and the troughs respectively may be the same, or may be different, for each of the plurality of diffraction blazes within the diffractive optical element.

The radius of curvature of the rounded corners of the peaks and troughs may be between 0.1 μm to 50 μm.

More specifically the radius of curvature at the rounded corner of the trough of at least one or more (or all) of the plurality of diffraction blazes may be between 5 μm and 50 μm.

It has been determined that for a diffraction blaze defined by an upper (peak) corner and a lower (trough) corner, and an edge between the peak and trough corners, the curvature of the trough corner helps with reducing the impact of image interference due to light scatter and also helps with crystal alignment, but with minimal loss of diffractive efficiency for the lens.

Similarly the radius of curvature at the peak of one or more (or all) of the plurality of diffraction blazes may be between 0.1 μm and 20 μm.

It has also been determined that the providing peaks with rounded corners and the provision of a non-vertical edge between the peak and trough corners primarily reduces the impact of image interference due to light scatter with minimal loss of diffractive efficiency for the lens.

The non-vertical edge between the peak and trough corners may be between near horizontal (1°) to near vertical (89°) and is only constrained by the physical geometry of the diffractive optical element.

The plurality of diffraction blazes may have an average height (between the peak and the trough of each diffraction blaze) of between 2.5 μm and 3.8 μm. Alternatively the plurality of diffraction blazes may have an average height of between 3.7 μm and 3.8 μm.

The height between the peak and trough of each diffraction blaze may be substantially uniform, and may also be the height of the diffractive optical element along the optical axis. This may be also between 2.5 μm and 3.8 μm, or alternatively between 3.7 μm and 3.8 μm.

In the context of the present application, a diffractive optical element is one in which the diffraction blazes are of a size and scale small enough relative to the wavelengths of the light incident on them so as to cause controlled and desired optical effects that result solely from the diffraction of light. For the avoidance of doubt, the diffractive optical elements do not include Fresnel lenses, which rely on refractive optical effects for focusing, rather than on diffraction.

In this context the effective refractive index is the refractive index of the liquid crystal for light normally incident on the contact lens and on the liquid crystal cell. The refractive index is 'effective' in that it is the average of the ordinary and extraordinary refractive indices in that the cholesteric liquid crystal.

In the matched state, the effective refractive index of the liquid crystal and the refractive index of the diffractive optical element match, and therefore the diffractive optical element does not diffract incident light.

In this matched state, it may be that the difference in the effective refractive index of the liquid crystal and the refractive index of the diffractive optical element at a wavelength of 450 nm is no more than 0.03, optionally no more than 0.02 and optionally no more than 0.01.

It may be that the difference in the effective refractive index of the liquid crystal and the refractive index of the diffractive optical element at a wavelength of 700 nm is no more than 0.03, optionally no more than 0.02 and optionally no more than 0.01.

It may be that the difference in the effective refractive index of the liquid crystal and the refractive index of the diffractive optical element in the visible part of the electromagnetic spectrum (between wavelengths of 450 nm and 700 nm) is no more than 0.03, optionally no more than 0.02 and optionally no more than 0.01. Optionally, such differences may be calculated at a plurality of wavelengths from 450 nm to 700 nm.

In the unmatched state, the effective refractive index of the liquid crystal and the refractive index of the diffractive optical element do not match, and therefore the diffractive optical element diffracts incident light.

In this unmatched state, at both 450 nm and 700 nm, an effective refractive index of the liquid crystal may be 0.80 to 1.20 times the refractive index of the diffractive optical element. At both 450 nm and 700 nm, the effective refractive index of the liquid crystal may be 0.90 to 1.10 times the refractive index of the diffractive optical element. At both 450 nm and 700 nm, the effective refractive index of the liquid crystal may be 0.95 to 1.05 times the refractive index of the diffractive optical element. At both 450 nm and 700 nm, the effective refractive index of the liquid crystal may be 0.97 to 1.03 times the refractive index of the diffractive optical element. At both 450 nm and 700 nm, the effective refractive index of the liquid crystal may be 0.98 to 1.02 times the refractive index of the diffractive optical element.

The liquid crystal may comprise a cholesteric liquid crystal. The use of a cholesteric liquid crystal in a switchable contact lens (as opposed to purely nematic liquid crystals or others) allows for an arrangement with only one liquid crystal cell, as there is no requirement for a second liquid crystal cell to address polarisation effects.

In an unmatched state, a director of the liquid crystal remote from the first inner surface and the second inner surface (and optionally midway between the first and second inner surfaces) may optionally be at an angle of no more than 20 degrees, optionally no more than 15 degrees, optionally no more than 10 degrees, optionally no more than 8 degrees, optionally no more than 5 degrees and optionally no more than 3 degrees to the first and second inner surfaces. In a switched (powered) state, a director of the liquid crystal remote from the first and second inner surfaces (and optionally midway between the first and second inner surfaces) may optionally be at an angle of at least 60 degrees, optionally at least 70 degrees, optionally at least 80 degrees and optionally at least 85 degrees to the first and second inner surfaces.

The applicant has discovered that it is advantageous for the average effective refractive index of the liquid crystal to be similar to that of the diffractive optical element in the visible part of the electromagnetic spectrum.

The average effective refractive index of the liquid crystal and the refractive index of the diffractive optical element may be determined at 37° C. (approximately the temperature corresponding to that of the human body).

The applicant has discovered that it is advantageous to use a diffractive optical element having a characteristic wavelength of operation lower than that which may typically be used for other lenses, such as lenses of spectacles.

A contact lens may incorporate the liquid crystal cell as described above.

The contact lens comprises a lens body for correcting the vision of a user. The lens body provides an optical power, which may be a positive power such as +0.5, +1.0 or +1.5D, or a negative power such as −0.5, −3.0 or −4.0D, or plano (0D). The optical power of the lens body may be fixed. The contact lens may have a first optical power in the unmatched state and a second optical power in the matched state, such that the vision may be corrected for any two of the near, far and/or intermediate vision of a user.

In the context of this application, "for correcting the vision of a user" means being suitable for correcting the near, far and/or intermediate vision of a user.

The contact lens body may be constructed of a polymer material. For example a polymerizable silicone elastomer could be used.

In the unpowered state the liquid crystal cell may be unmatched and contribute a negative focal power to the lens such that the resultant focal power of the lens is less positive than in the powered state. In the powered state the liquid crystal cell may then be matched and contribute no focal power to the lens, such that only the optical power of the lens body contributes to the vision correction in this state.

In this way the lens has a 'failsafe' arrangement; if electrical power to the liquid crystal cell is interrupted or fails, the lens defaults to a 'far' focal length, in which the lens focal power is reduced by the negative focal power provided by the unmatched liquid crystal cell. In the electrically powered state, the liquid crystal contributes no focal power to the lens, so the lens focal power remains unaltered, leading to the 'near' focal length.

Similarly, in the unpowered state the liquid crystal cell may be matched and contribute no focal power to the lens. In the powered state the liquid crystal is then unmatched and arranged to add a positive focal power to the lens such that the resultant focal power of the lens is more positive than in the matched state.

In this way the lens has a 'failsafe' arrangement; if electrical power to the liquid crystal cell is interrupted or fails, the lens defaults to a 'far' focal length, where the focal power of the lens body is unaltered by the liquid crystal cell. In the electrically powered state, the liquid crystal contributes a positive focal power to the lens, leading to the 'near' focal length.

Such 'failsafe' arrangements are important for a user, since any failure of electrical power within the lens should leave a user able to see objects in a far field. Reading spectacles may be used as an alternative to the near field state of the switchable contact lens, even with the contact lens still fitted to the user. If this 'failsafe' was not provided, the electrically powered state would be the 'far' focal length, and failure of the electrical power within the lens would lead to the contact lens defaulting to 'near', which could be problematic until the user is able to remove the contact lens.

The disclosure further provides, in accordance to a further aspect of the disclosure, a method of fabricating an electrically-switchable contact lens assembly for correcting the vision of a user. The method includes providing first and second contact lens polymer elements each having respective front and a rear surfaces, the front surface of the first contact lens polymer element including a recess. A liquid crystal cell is then inserted into the recess. The liquid crystal cell includes a diffractive optical element, and is switchable between an unmatched state and a matched state. The front surface of the first polymer element is attached to the rear surface of the second polymer element to form the contact lens assembly. In the unmatched state, the effective refractive index of the liquid crystal is different from the refractive index of the diffractive optical element, and in the matched state the effective refractive index of the liquid crystal matches the refractive index of the diffractive optical element. In this way, when in the matched state the diffractive optical element does not contribute a focal power for the lens assembly.

The method may further include lathing a first shape which includes the recess, at the front surface of the first contact lens polymer element, and lathing a second shape at the rear surface of the second contact lens polymer element. The second shape may match the first shape.

In this way the two shapes allow for the presence of the recess within the body of the lens assembly.

The method may further include the step of, after attaching the first and second polymers, lathing the front surface of the contact lens assembly.

This lathing step may cut material from the front surface of the second polymer element of the assembly, and additionally it may also cut material from the front surface of the first polymer element if the geometry allows.

The step of inserting a liquid crystal cell into the recess may also include inserting optoelectronic power and control elements into the recess for selectively powering the liquid crystal cell.

It will be appreciated that such optoelectronic power and control elements provide selective power to the liquid crystal cell, via terminals electrically coupled to electrodes of the liquid crystal cell.

Exemplary embodiments of the present disclosure will now be described by way of example only with reference to FIGS. 1 to 8.

An example of an electrically-switchable liquid crystal cell 10 in accordance with an embodiment of the first aspect of the present disclosure is shown in FIG. 1. The liquid crystal cell 10 is made of a base material 18 into which a diffractive optical element is formed, comprising a number of diffraction blazes 12. Each of the diffraction blazes 12 is disposed between an anterior inner surface 16 and a posterior inner surface 17 of the liquid crystal cell 10. For the sake of clarity only the diffraction blazes 12 on the left side of the FIG. are labelled. Each diffraction blaze 12 has an upper corner or peak 20, which touches the anterior inner surface 16, and a lower corner or trough 30, which touches the posterior inner surface 17. An edge 25 of each diffraction blaze 12 extends between each peak 20 and each trough 30.

It will be appreciated that FIG. 1 is a side-on cutaway view and that when viewed from above the diffraction blazes 12 are annular in shape and their corresponding upper and lower corners 20 and 30 respectively are annular ridges.

The lower half of each diffraction blaze 12 is filled with liquid crystal material 14, which is a cholesteric liquid crystal comprising a nematic liquid crystal that has been doped with a chiral dopant. Such nematic liquid crystals are well-known to those skilled in the art (of liquid crystal science), and may comprise E7, BL037 and/or BL038, for example. Such chiral dopants are also well-known to those skilled in the art of liquid crystal science, such as Merck ZLI-3786, CB15 and S811.

The upper portion of each diffraction blaze 12 comprises the base material 18.

The height 35 of the diffractive optical element is the height between the anterior inner surface 16 and the posterior inner surface 17. This is also the height between the peak 20 and the trough 30 of each diffraction blaze 12.

The liquid crystal cell 10 also includes electrodes (not shown) for receiving a voltage to be further described below in relation to electrical switching of the liquid crystal cell 10 between unpowered and powered states.

Figure 2:
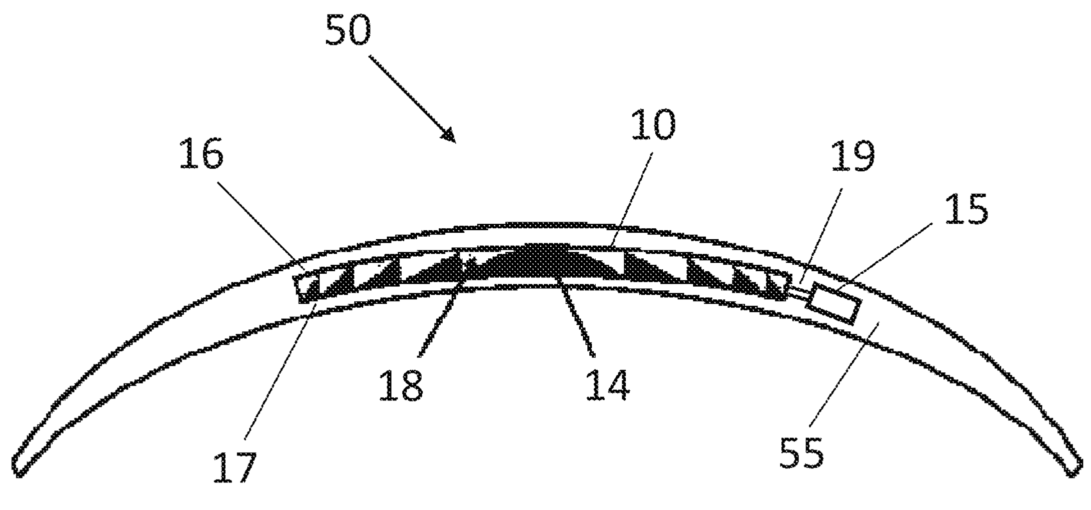
FIG. 2 is a schematic side-on cutaway view of an example of a contact lens incorporating the liquid crystal cell of FIG. 1.

FIG. 2 is a schematic cross-sectional view of a contact lens 50, which comprises a lens body 55 comprising any suitable contact lens material, into which has been incorporated the liquid crystal cell 10 of FIG. 1. Also incorporated into the lens body 55 are optoelectronic components 15 associated with the liquid crystal cell 10, which may include a power supply and a control element. The optoelectronic components 15 are coupled to selectively provide power to the liquid crystal cell 10 via an electrical coupling 19.

The liquid crystal cell 10 is provided for correcting the vision of a user in the following way: Briefly, the liquid crystal cell 10 is switchable between a first, unmatched state and a second, matched state. In the matched state, the effective refractive index of the liquid crystal matches that of the diffractive optical element, and the diffractive optical element has a first focal power. In the unmatched state, the effective refractive index of the liquid crystal does not match the refractive index of the diffractive optical element, and the diffractive optical element has a second focal power, different from the first focal power.

The effective refractive index of the liquid crystal material 14 depends on the orientation of the molecules of the liquid crystal material 14. Local alignment of the molecules in the liquid crystal cell 10 is shown schematically in FIG. 3A in an unpowered state. Between the anterior inner surface 16 and the posterior inner surface 17, the director of the liquid crystal material 14 forms a helical structure to be further described below. The rod shapes 60 indicate that the director of the liquid crystal is approximately parallel to the anterior inner surface 16 and the posterior inner surface 17, and in the plane of the FIG. In this unpowered state, the effective refractive index of the liquid crystal is polarisation-independent, and is given by $n_{ave}=0.5\ (n_e+n_o)$, where $n_e$ is the extraordinary refractive index and $n_o$ is the ordinary refractive index. Those skilled in the art will realise that it is desirable for the pitch of the liquid crystal to be no more than 500 nm (i.e. approx. the same, or less than, the wavelength of the incident light) in order that liquid crystal behaves, to a reasonable approximation, as a single refractive index material.

Figure 3A:
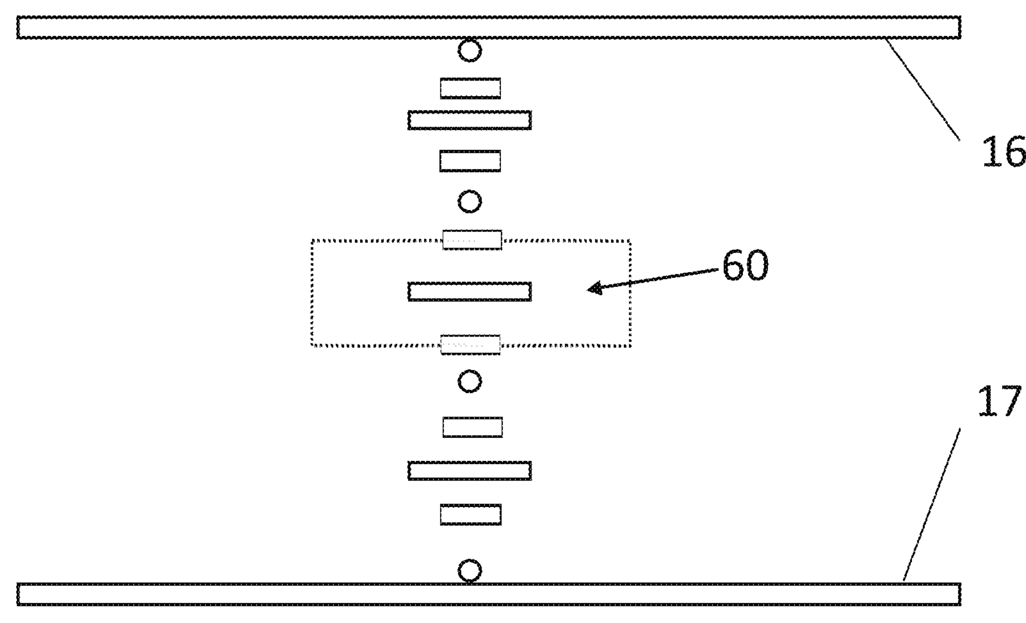
FIG. 3A is a schematic representation of the local alignment of liquid crystal molecules in a liquid crystal cell in an unmatched state.
Figure 3B:
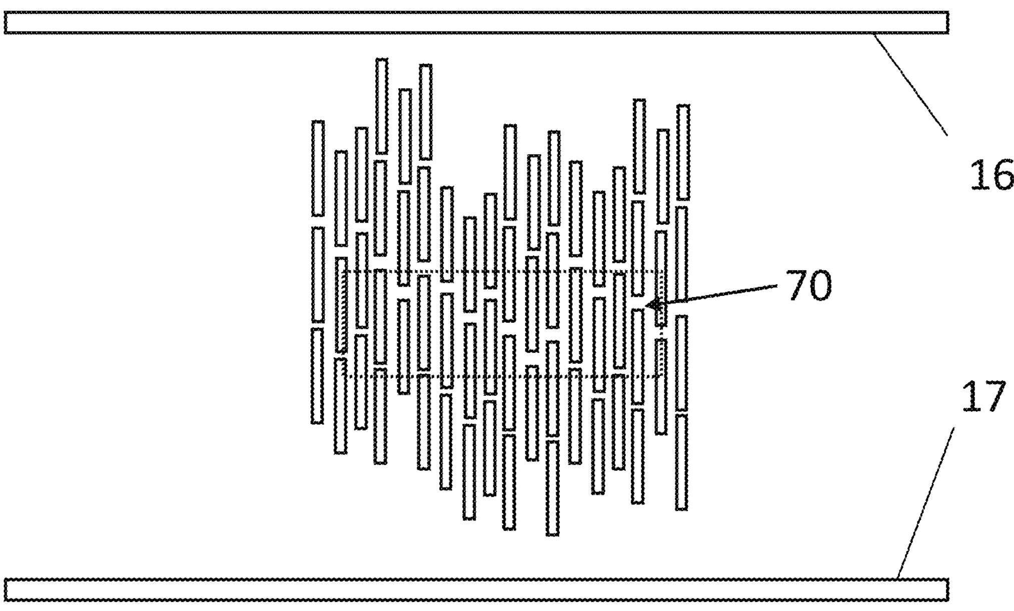
FIG. 3B is a schematic representation of the local alignment of liquid crystal molecules in a liquid crystal cell in a matched state.

When a suitable voltage is applied to the liquid crystal cell 10 via the optoelectronic components 15 and the electrical coupling 19, the molecules of the liquid crystal material 14 are switched into a homeotropic state shown schematically in FIG. 3B, where the rod shapes 70 indicate that the director of the liquid crystal material 14 is normal to the anterior inner surface 16 and the posterior inner surface 17. This realignment of the liquid crystal material 14 provides a different effective refractive index. In this second, switched (powered) state, the effective refractive index may be $n_o$.

When the liquid crystal material 14 is in the powered state, the effective refractive index of the liquid crystal material 14 matches the refractive index of the base material 18, in which case the diffractive optical element makes no contribution to the focal power of the lens. Conversely, when the liquid crystal material 14 is in the unpowered state, the effective refractive index of the liquid crystal material 14 does not match the refractive index of the base material 18, and therefore the diffractive optical element makes a contribution to the focal power of the lens.

Considering now the contact lens 50 in which the liquid crystal cell 10 is mounted, the lens body 55 may have a positive focal power, and the selectively applied diffractive power of the liquid crystal cell 10 may be a negative focal power. With electrical power to the liquid crystal cell 10 switched off, the negative optical power of the diffractive optical element is combined with the positive lens power of the lens body 55, providing a resultant optical power, which is less positive than the lens power of the lens body 55 alone, and which is suitable for distance vision.

Conversely when the electrical power to the diffractive element is switched on, (supplied by the optoelectronic components 15 and the electrical coupling 19) the effective refractive index of the liquid crystal cell 10 matches the refractive index of the base material 18 and there is no optical diffractive power contribution from the liquid crystal cell 10. In this state the optical power of the contact lens 50 is simply the positive lens power of the lens body 55, which is the required power for near vision.

By way of example, the lens body 55 may have a focal power of +2D, and the focal power of the diffractive element when visible may be −2D. Therefore the optical power of the contact lens is switchable between 0D (when switched off, diffractive active) and +2D (when switched on, diffractive inactive).

Figures 7, 8:
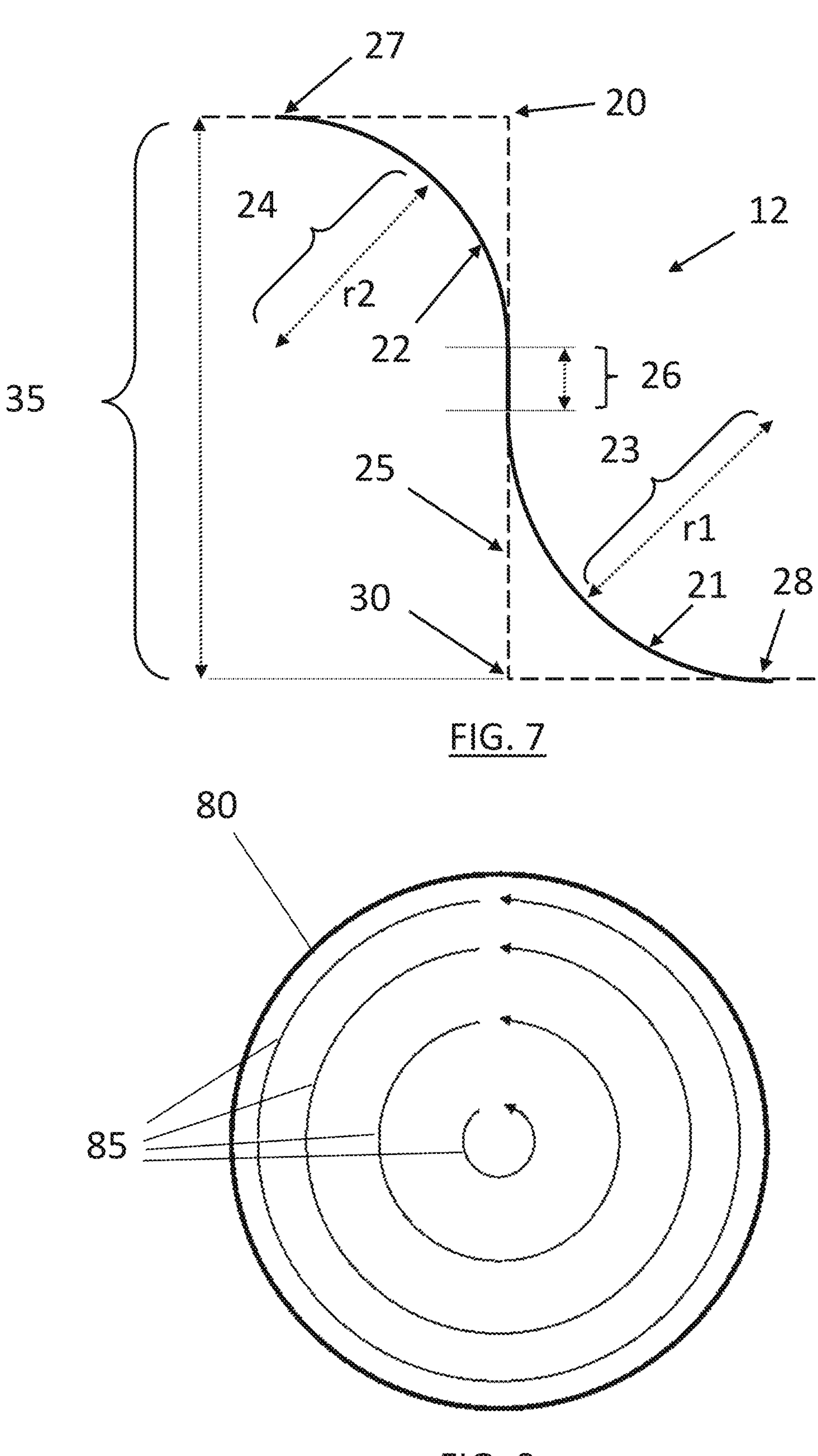
FIG. 7 is an illustrative diagram of a diffraction blaze forming part of the liquid crystal cell of FIG. 1.
FIG. 8 is a schematic plan view of the alignment of the director of liquid crystal adjacent an alignment polymer.

The alignment of the director of the liquid crystal material 14 adjacent an alignment polymer 80 is shown in FIG. 8, with arrows 85 indicating the direction of the director of the liquid crystal material 14 adjacent the alignment polymer. Such an alignment is used to provide polarisation-independent operation of the contact lens 50.

Optical modelling for different diffractive heights is now described with reference to FIGS. 4A to 6B, which show graphs of diffractive efficiency (%) for different diffractive orders as function of wavelength (nm). Diffractive efficiency for a given order is the ratio of optical power propagating away from the diffractive element to the optical power incident on the diffractive element.

The base material 18 chosen is of low diffractive index, such as polymethyl methacrylate (PMMA) lens material.

The liquid crystal material 14 may be a mixture of BL037 and BL038 material, and a 50/50 mixture has been found to produce very good index matching for near field performance, without any unwanted shifting in far field performance (100% BL037 was found to produce a slight shift to red in far field).

Figure 4A:
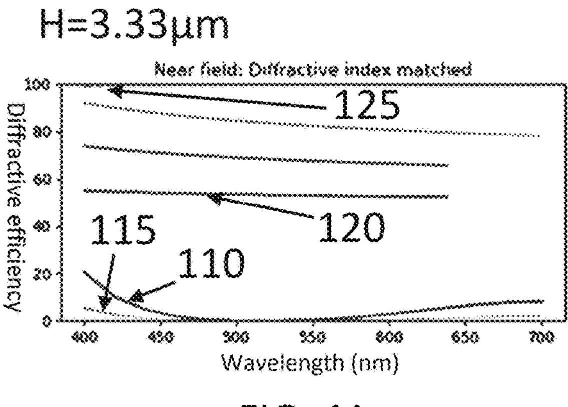
FIGS. 4A and 4B are plots of diffractive efficiency against wavelength at near and far fields respectively of a powered diffractive element with a diffractive height of 3.33 μm.

FIG. 4A is a graph of near field efficiency of a diffractive element of height 3.33 μm. The liquid crystal cell 10 is in matched state where the effective refractive index of the liquid crystal and the diffractive optical element are substantially the same, i.e. matched, and therefore the diffractive optical element is not active. The intensity of the various order diffraction profiles are observed from the diffractive optical element. It can be seen that the intensity of the profiles observed from the diffractive optical element are small at all wavelengths. A first curve 110 of the graph shows first order diffraction as a function of wavelength, and a second curve 115 shows second order diffraction as a function of wavelength. The first and second order diffraction profiles in FIG. 4A are shown multiplied by 100. As can be seen from the graph, residual first order light at 450 nm is approximately 0.05% and residual second order light at that wavelength is closer to 0.01%. The overall diffractive efficiency (given by line 120) is around 50%. The 0 order (i.e. directly incident) light is greater than 99%, as shown by the dotted line 125.

Figure 4B:
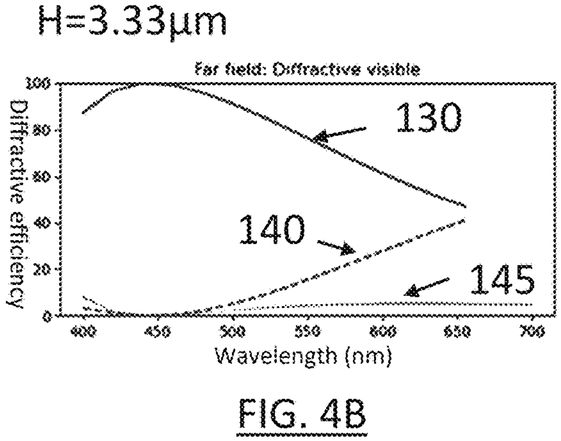

FIG. 4B shows a graph of diffractive efficiency at far field with a diffractive element of height 3.33 μm. This occurs when the liquid crystal cell 10 is in the unpowered state, which results in the diffractive optical element being visible and contributing to the focal power of the lens 50. This can be considered to be the distance vision state. In the event of a power failure, the contact lens defaults to this distance vision state where the optical power of the lens 50 is without the contribution of the diffractive element. The curve 130 shows the first order peak, which represents the majority of the light seen by a user. It has a peak at 450 nm and a tail at higher wavelengths. The curve 140 shows the $0^{th}$ order (i.e. direct light) which in this case should be as small as possible, but with a trough at 450 nm and slightly higher levels at higher wavelengths, which introduces some blue shift. Curve 145 shows second order light.

Figure 5A:
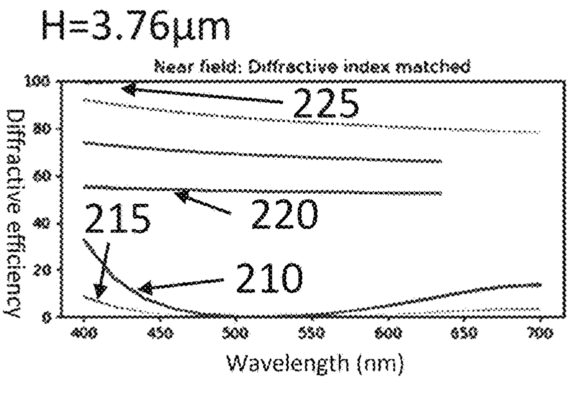
FIGS. 5A and 5B are plots of diffractive efficiency against wavelength at near and far fields respectively of a powered diffractive element with a diffractive height of 3.76 μm.

FIG. 5A shows a graph of near field diffractive efficiency similar to that of FIG. 5A, but with a diffractive element of height 3.76 μm. Again the liquid crystal cell 10 is in matched state where the effective refractive index of the liquid crystal and the diffractive optical element are substantially the same, i.e. matched. First and second order diffraction profiles shown in FIG. 5A are shown multiplied by 100. As can be seen from the curve 210, residual first order light at 450 nm is approximately 0.1%. A further curve 215 shows second order diffraction. The overall diffractive efficiency (given by line 220) is around 55%. Finally the 0 order (i.e. directly incident) light is greater than 99%, as shown by line 225.

Figure 5B:
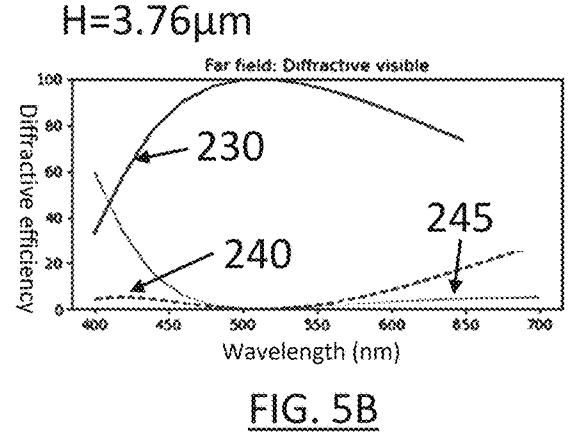

FIG. 5B shows a graph of far field diffractive efficiency similar to that of FIG. 5B with a diffractive element of height 3.76 μm. Again the far field occurs when the liquid crystal cell 10 is in the second, non-active, state, i.e. the distance vision state. The curve 230 shows that the first order peaks now occur at around 525 nm, with an acceptable level of performance over the visible spectrum. Similarly curve 240 shows the $0^{th}$ order trough between 500 and 550 nm. Curve 245 shows second order light.

Figure 6A:
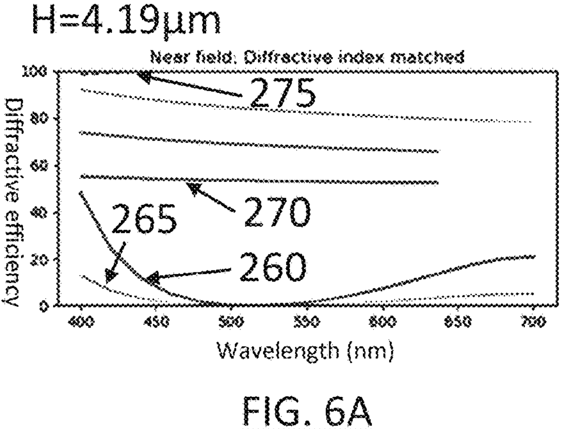
FIGS. 6A and 6B are plots of diffractive efficiency against wavelength at near and far fields respectively of a powered diffractive element with a diffractive height of 4.19 μm.

FIG. 6A shows a graph of near field diffractive efficiency similar to that of FIGS. 5A, and 6A but with a diffractive element of height 4.19 μm. Again the liquid crystal cell 10 is in matched state where the effective refractive index of the liquid crystal material 14 and the base material 18 of the diffractive optical element are substantially the same, i.e. matched. First and second order diffraction profiles shown in FIG. 6A are shown multiplied by 100. As can be seen from the curve 260, residual first order light at 450 nm is approximately 0.1%. A further curve 265 shows second order diffraction. The overall diffractive efficiency (given by line 270) is around 55%. Finally the 0 order (i.e. directly incident) light is greater than 99%, as shown by line 275.

Figure 6B:
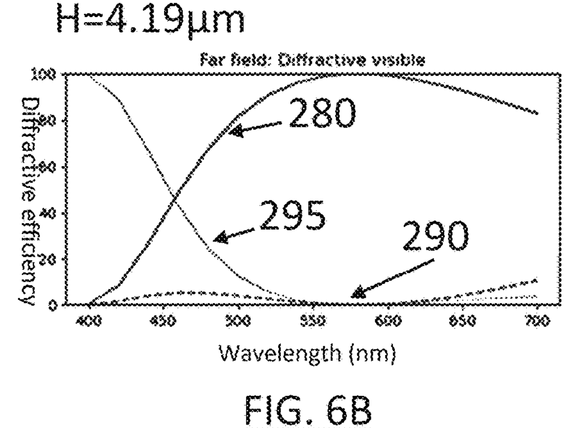

FIG. 6B shows a graph of far field diffractive efficiency similar to that of FIGS. 5B and 6B with a diffractive element of height 4.19 μm. Again the far field occurs when the liquid crystal cell 10 is in the second, non-active, state, i.e. the distance vision state.

The curve 280 shows the $0^{th}$ and first order peaks now occur at around 500 nm, and the curve 290 shows the $0^{th}$ order trough is between 550 and 600 nm. This indicates a slight red shift. Curve 295 shows second order light.

Therefore it can be seen that diffractive height mainly affects far field performance; at a diffractive height of 3.33 μm the envelope being shifted to the left (revealing some effects in the blue end of the spectrum), and conversely shifting to the right (revealing some effects in the red end of the spectrum) at a diffractive height of 4.19 μm. Given these results the preferable diffractive height has been determined to be approximately 3.76 μm in this example.

Referring now also to FIG. 7, a cross sectional close-up representation of a side view of a diffraction blaze 12 of the liquid crystal cell 10 is shown. It will be appreciated that when viewed from above, the blaze 12 has an annular form. As may be observed from FIG. 1, multiple diffraction blazes 12 are required in order to form a diffractive optical element. There may be 16 diffraction blazes, or more or less than 16 diffraction blazes. The number of blazes may be proportional to the square of the diameter of the optical zone of the contact lens, and linearly proportional to the optical power to be provided by the diffractive optical element.

The standard diffraction blaze shape used for optimal diffractive efficiency is illustrated by the dotted line which includes an upper corner 20 and lower corner 30, both of substantially 90 degrees, together with a vertical edge 25 between the upper corner 20 and the lower corner 30. The height 35 of the diffractive optical element substantially corresponds to the length of the vertical edge 25 (i.e. the vertical separation between the upper corner 20 and lower corner 30).

The applicant has surprisingly found that by replacing one or both of the upper and lower corners 20 and 30 respectively with curves of an appropriate length, scatter and liquid crystal alignment problems are reduced, with an acceptable trade-off in terms of diffractive efficiency.

In this example, a lower curve 21 having a radius r1 (line 23) and ending in a trough 28 replaces the lower corner 30. An upper curve 22 having a radius r2 (line 24) and ending in a peak 27 replaces the upper corner 20. The height 35 of the diffractive optical element is now defined by the vertical separation between the peak 27 of the upper curve 22 and the trough 28 of the lower curve 21. The vertical edge 25 is now replaced with an edge 26, which extends between the lower curve 21 and the upper curve 22. (The edge 26 between the lower curve 21 and the upper curve 22 may be dispensed with entirely, if the lower curve 21 and the upper curve 22 touch each other).

Furthermore the lower curve 21 and the upper curve 22 may create an arc subtending a central angle of less than 90 degrees. Alternative arrangements of 45 degrees, 60 degrees or other intermediate subtended angles are possible. In these cases edge 26 may be angled away from the vertical.

Surprisingly, it has been discovered that for a diffractive height 35 of approximately 3.76 μm, replacing the lower corner 30 of each blaze 12 with lower curve 21 having a radius of curvature r1 (line 23) of between 5 μm and 50 μm, and replacing the upper corner 20 of each blaze 12 with upper curve 22 having a radius of curvature r2 (line 24) of between 0.1 μm and 20 μm provides an acceptable level of optical performance of the diffractive element of the liquid crystal cell 10 while ensuring good switching characteristics of the liquid crystal material 14.

The exemplary contact lenses described above provide unexpectedly good peripheral imaging performance. It might be expected that light be incident on the diffractive optical element from a wide range of angles, and that such a wide variation in incident angles and the curvature of the cornea may lead to a large variation in optical path lengths through the diffractive optical element leading to poor optical performance. However, the applicant has discovered that peripheral light entering the contact lens and making its way through the pupil goes through a part of the diffractive optical element that is approximately normal to the incoming light i.e. the light is approximately from the same direction, and there is little variation in the angle of incidence. This leads to good peripheral imaging performance.

Furthermore, as the angle of incidence of light increases from the normal, the amount of light passing through the diffractive optical element decreases. At some angle, essentially no light will pass through the diffractive optical element, and no optical artefacts will be seen. For example, for light at ~53° incidence and a 5 mm pupil size approximately half of a detected ray bundle is incident on the diffractive optical element, and the other half goes through the non-diffractive region of the contact lens. For light at higher angles of incidence, the effective area of the diffractive optical element that is exposed to light is reduced even further so that optical artefacts become negligible as the ray bundle moves out of the diffractive region entirely. There is therefore no abrupt start/stop of the diffractive region as far as the user is concerned, just a smoothly varying amplitude of contribution. In contrast with a spectacle lens implementation a sharp jump may be observed when switching between looking through and not looking through a diffractive optical element.

The applicant has also discovered that astigmatism of peripheral light induced by incident light passing through the diffractive optical element at a non-normal angle is acceptable (averaging about 0.3D).

Figure 10:
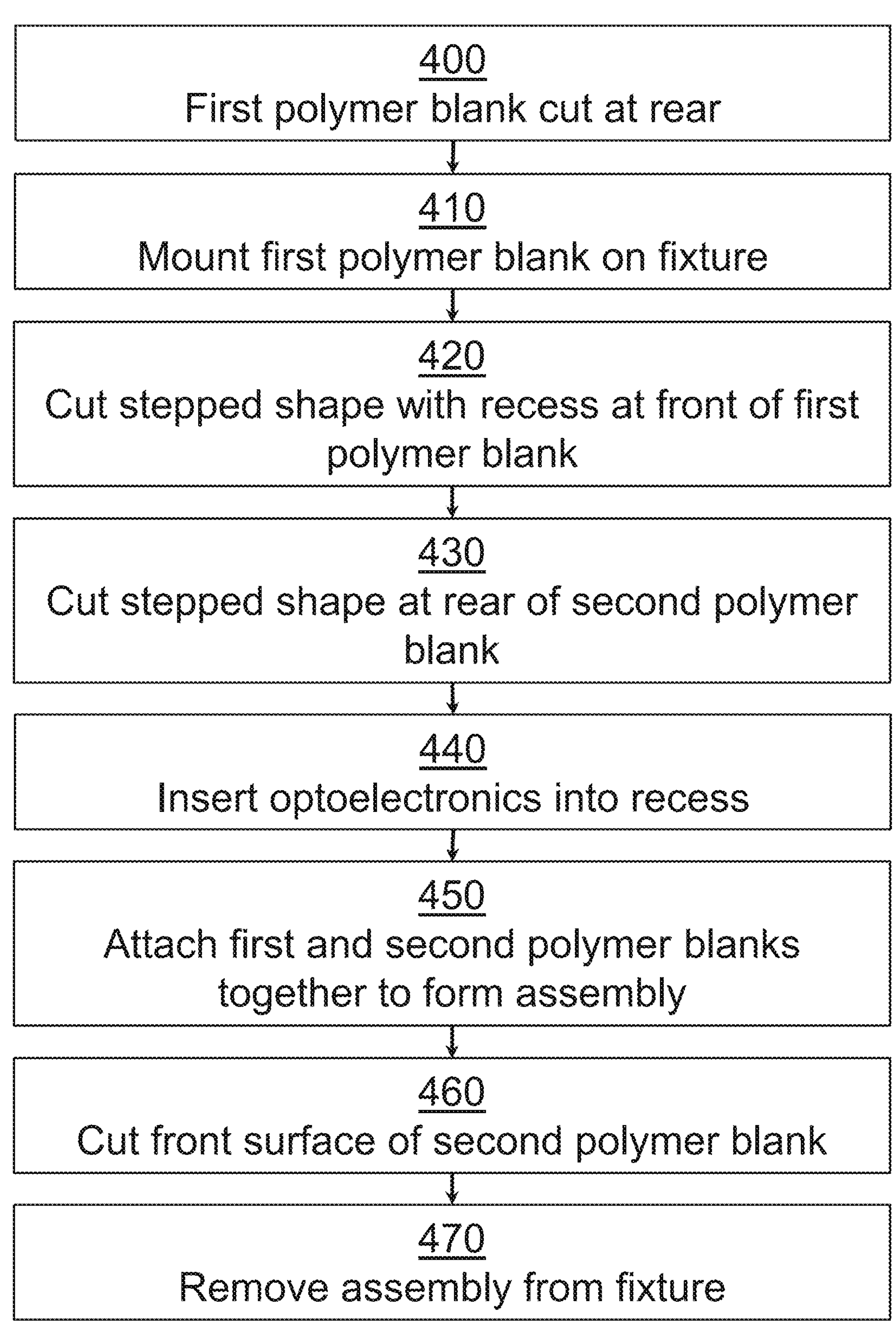
FIG. 10 is a flow chart of the method steps shown in FIGS. 9A to 9F.

Referring now also to FIGS. 9A to 9F and to FIG. 10 a method of fabricating a contact lens is shown. In FIG. 9A, a first anhydrous polymer blank 300 is provided. The method starts with a cut 320 which is made by a lathe tool in a rear surface 310 of the first polymer blank 300 (box 400 of FIG. 10), to a required curvature. The lathe tool used is typically a digital lathe with an industrial diamond.

As shown in FIG. 9B, the corresponding cut surface 335 of the first polymer blank 300 is then securely mounted on a fixture 330 (box 410) with wax 340 which is applied along the cut surface 335.

Then, as shown in FIG. 9C the lathe tool is used to remove material 350 from a front surface 345 of the first polymer blank 300 (box 420) in order to sculpt a stepped shape thereon, which includes a recess 360.

After this, a second polymer blank 370, as shown in FIG. 9D, is subject to a cutting process where the lathe tool removes material 375 from the rear surface of the polymer blank 370 (box 430), in order to create a further stepped shape which substantially coordinates with the stepped shape of the front surface of the first polymer blank 300, except for the recess 360.

An optoelectronic package 380 is inserted in the recess 360 of the first polymer blank 300 (box 440). The optoelectronic package 380 includes the liquid crystal cell 10 and the optoelectronic components 15 including the power and control elements as described above.

Glue is then applied between the first polymer blank 300 and the second polymer blank 370, and the two are attached together with the optoelectronic package 380 sandwiched between them within the recess 360 (box 450).

Then the lathe tool is used to cut away the front surface 385 of the second polymer blank 370 (box 460), to form lens assembly 390 as shown in FIG. 9E comprising a shaped lens element 395 glued to the first polymer blank 300, which is still mounted on the fixture 330 (not shown in FIG. 9E, which is a side view).

Finally, as shown in FIG. 9F, the lens assembly 390 is removed from the fixture by dissolving the wax 340 (box 470). The optoelectronic package 380 is shown in this cutaway FIG.

One or both sides of the lens assembly 400 may be polished if necessary to remove any edges before being soaked in an extracting and/or hydrating solution to hydrate the lens assembly 400.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

The use of a diffractive optical element is not limited to liquid crystal cells comprising a cholesteric liquid crystal. For example, other types of liquid crystal could be used including undoped nematic and smectic liquid crystals.

The arrangement of stepped shapes cut into the first and second polymer blanks may differ from that shown in the drawings, as may the shape and configuration of the recess.

Furthermore the lathing process described above could be replaced by alternative contact lens fabrication processes such as molding.

The arrangement of the diffractive element described above, including the number of diffraction blazes, and their dimensions such as blaze height and radius of curvature of the peaks and troughs, may differ from those described above.

Furthermore in contrast to the arrangement described above, it will be appreciated that the liquid crystal cell may be arranged to be unmatched in the powered state, and matched in the unpowered state. In such an arrangement, in the unpowered state the liquid crystal cell does not provide a positive power to the lens, and in the powered state the liquid crystal cell provides a positive power to the lens.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. An electrically-switchable liquid crystal cell for changing a focal power of a contact lens, the liquid crystal cell comprising a diffractive optical element, the liquid crystal cell being switchable between an unmatched state and a matched state, wherein:

in the unmatched state, the effective refractive index of the liquid crystal is different from the refractive index of the diffractive optical element; and in the matched state, the effective refractive index of the liquid crystal matches the refractive index of the diffractive optical element, such that the diffractive optical element does not contribute a focal power for the contact lens, and wherein the diffractive optical element comprises a plurality of diffraction blazes, each one of the plurality of diffraction blazes defining a peak and a trough wherein more than one of the plurality of diffraction blazes has a trough with a rounded corner having a radius of curvature of between 5 μm and 50 μm; and more than one of the plurality of diffraction blazes has a peak with a rounded corner having a radius of curvature of between 0.1 μm and 20 μm.

2. The electrically-switchable liquid crystal cell of claim 1, wherein each one of the plurality of diffraction blazes has a trough with a rounded corner having a radius of curvature of between 5 μm and 50 μm.

3. The electrically-switchable liquid crystal cell of claim 1, wherein each one of the plurality of diffraction blazes has a peak with a rounded corner having a radius of curvature of between 0.1 μm and 20 μm.

4. The electrically-switchable liquid crystal cell of claim 1, wherein the plurality of diffraction blazes have an average height of between 2.5 μm and 3.8 μm.

5. The electrically-switchable liquid crystal cell of claim 4, wherein the plurality of diffraction blazes have an average height of between 3.7 μm and 3.8 μm.

6. The electrically-switchable liquid crystal cell of claim 1, wherein the liquid crystal cell comprises a cholesteric liquid crystal.

7. An electrically-switchable contact lens for correcting the vision of a user comprising the liquid crystal cell of claim 1.

8. The electrically-switchable contact lens of claim 7, wherein the electrically-switchable contact lens comprises a polymer lens body.

9. The electrically-switchable contact lens of claim 7, wherein in the unmatched state the liquid crystal cell contributes a negative focal power to the lens such that in the unmatched state the resultant focal power of the lens is less positive than in the matched state.

10. A method of fabricating an electrically-switchable contact lens assembly for correcting the vision of a user, the method comprising:

providing first and second contact lens polymer elements each having respective front and rear surfaces, the front surface of the first contact lens polymer element including a recess;

inserting into the recess the electrically-switchable liquid crystal cell according to claim 1; and attaching the front surface of the first polymer element to the rear surface of the second polymer element to form the contact lens assembly.

11. The method of claim 10, said method further comprising the steps of:

lathing a first shape at the front surface of the first contact lens polymer element, the shape including the recess;

lathing a second shape at the rear surface of the second contact lens polymer element, the second shape matching the first shape.

12. The method of claim 10, wherein the method further comprises, after the step of attaching, lathing the front surface of the contact lens assembly.

13. The method of claim 10, wherein the step of inserting a liquid crystal cell into the recess further comprises inserting optoelectronic power and control elements for selectively powering the liquid crystal cell.

* * * * *